(No Model.) 2 Sheets—Sheet 1.
G. R. FENNER.
BICYCLE.
No. 510,167. Patented Dec. 5, 1893.
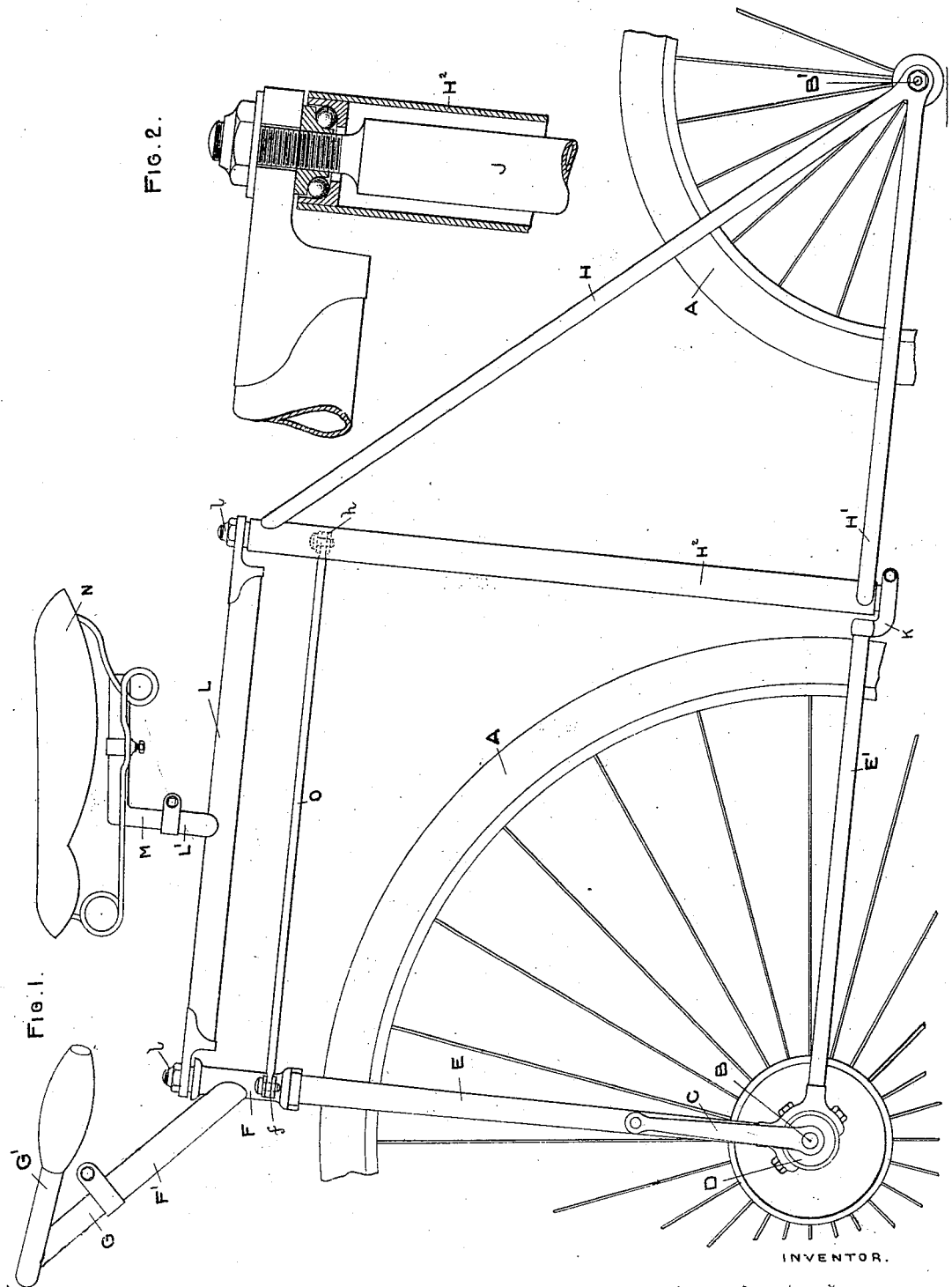
WITNESSES.
INVENTOR.
George Richard Fenner (No Model.) 2 Sheets—Sheet 2.
G. R. FENNER.
BICYCLE.
No. 510,167. Patented Dec. 5, 1893.
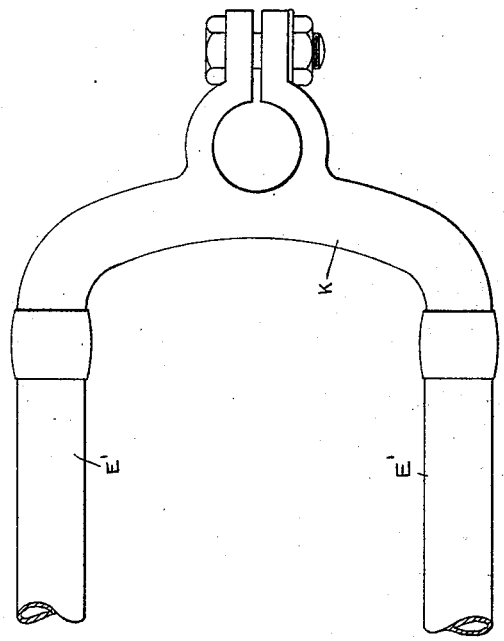
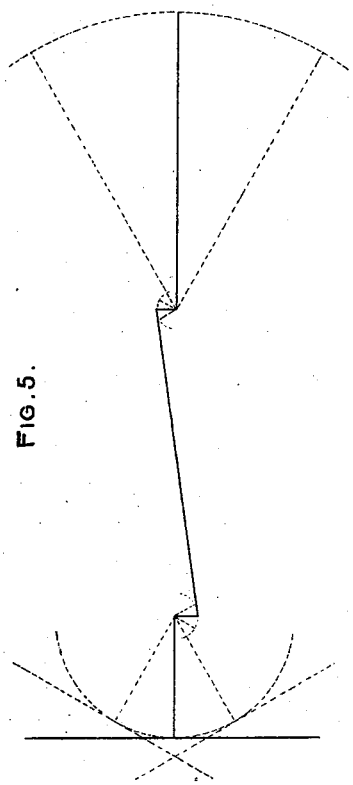
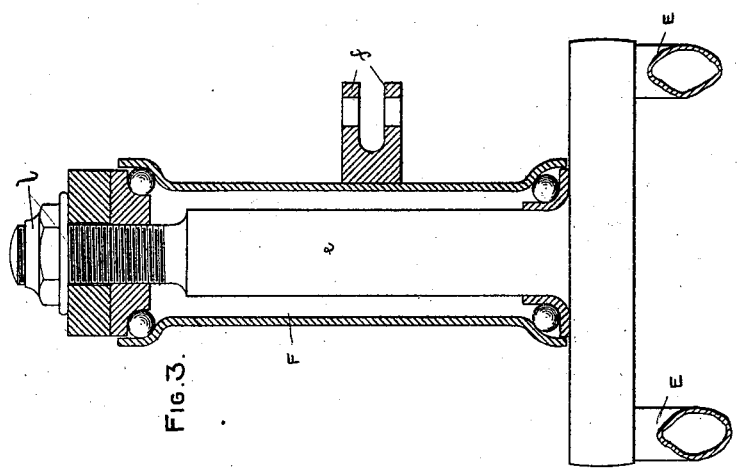
WITNESSES.
INVENTOR.
George Richard Fenner
Attorney.
THE NATIONAL LITHOGRAPHING COMPANY,
WASHINGTON, D. C.

UNITED STATES PATENT OFFICE.

GEORGE RICHARD FENNER, OF LONDON, ENGLAND.

BICYCLE.

SPECIFICATION forming part of Letters Patent No. 510,167, dated December 5, 1893.

Application filed April 17, 1893. Serial No. 470,660. (No model.) Patented in England January 28, 1893, No. 1,943.

*To all whom it may concern:*

Be it known that I, GEORGE RICHARD FENNER, a subject of the Queen of Great Britain, residing at Lambeth, London, in the county of Surrey, England, have invented a new and useful Improvement in Bicycles, (for which I have obtained a patent in Great Britain, No. 1,943, bearing date January 28, 1893,) of which the following is a specification.

My invention relates to an improved construction of bicycle in which the front wheel is a driving wheel, and both the front and rear wheels are operated to steer the machine, the object being the prevention of the application of power to the driving cranks having any influence over the steering of the machine. I attain this end in the manner illustrated in the accompanying drawings, in which—

Figure 1 Sheet No. 1 is a broken view in side elevation of a bicycle constructed according to my invention. Fig. 2 Sheet No. 1 is a broken view—on an enlarged scale—showing the construction of the steering head or joint. Fig. 3 Sheet No. 2 is a broken view—on an enlarged scale—showing the center on which the socket carrying the transverse handle bar and the steering arm are mounted. Fig. 4 Sheet No. 2 is a view in plan of the bracket carrying the lower end of the center spindle of the steering head, and Fig. 5 Sheet No. 2 is a diagram showing how the steering is effected.

Similar letters refer to similar parts throughout the several views.

The front driving wheel A is mounted either directly or indirectly on the axle B, which is fitted with driving cranks C of the usual construction. The axle B is carried in bearings D fixed to or carried by a vertical fork E and a horizontal fork E′. The vertical fork E is extended upward in the form of a hollow stem $e$ on which is loosely mounted a socket F carrying a forwardly extending tube or socket F′ adapted to receive the pillar G carrying the handle bar G′. Suitable ball bearings are interposed between the stem $e$ of the fork E and the socket F to reduce friction. The rear wheel A′ is loosely mounted on an axle B′ carried by a triangular frame, the members H and H′ of which are double to form forks in which the wheel runs, and the member $H^2$ is a single tubular member rigidly connected or attached to the members H and H′. Within the member $H^2$ is loosely mounted—in suitable ball bearings—a center spindle J, the adjustable cones of the ball bearing being threaded on the ends of the said spindle. This spindle J and tubular member $H^2$ forms the steering joint or head of the machine which is located between the two wheels. The lower end of the spindle J is attached to the horizontal fork E′ carrying the front driving wheel, by means of a cranked bracket K, and the upper end of the spindle J is connected with the tubular extension $e$ of the vertical fork E by means of a tubular member L carrying a socket L′ adapted to receive the seat pillar M carrying the combined saddle and spring N, the said member L being clamped to the adjusting cones on the spindle J, and the stem $e$ of the front fork E, by means of suitable nuts and washers $l$, $l$.

The socket F is connected with the member $H^2$ of the frame carrying the rear wheel by means of a coupling rod O connecting an arm or bracket $f$ fixed to the socket F on one side thereof, and an arm or bracket $h$ on the side of the member $H^2$ of the rear frame opposite to the side of the socket F on which the arm or bracket $f$ is fixed, so that the movement of the socket F in one direction causes the tubular member $H^2$ to move in the other direction, thus causing the steering to be divided equally between each wheel of the machine.

Instead of using a coupling rod and arms or brackets to connect the socket F with the tubular member $H^2$, I may use either a pair of such coupling rods, in which case flexible links may be substituted for the said rods, or I may use flexible links or chains passing round quadrants or their equivalents formed on or fixed to the said socket and tubular member $H^2$ respectively.

As I use small wheels in this construction of bicycle, I prefer to mount the driving wheel A loosely on its axle B and to interpose between the said parts any suitable form of gearing which will impart to the driving wheel a speed of rotation superior to that of the axle.

I am aware that it is not broadly new either to construct bicycles in which the front wheels are the driving wheels, or to use a gearing between such wheels and their axle to improve their speed of rotation, and I do not therefore claim such as my invention; but What I do claim, and desire to secure by Letters Patent, is—

In a bicycle the combination of the driving wheel "A" and the trailing wheel "A'" placed tandem fashion; of the rectangular frame, consisting of the forks "E" and "E'" straddling the driving wheel, the spindle or post "J" and the upper member "L," carrying the driving wheel and the seat for the rider; of the triangular frame consisting of the forks "H" and "H'" and of the tubular socket "H²" fitting over the spindle or post "J" forming part of the rectangular frame carrying the driving wheel, and forming with the said spindle or post the steering head or socket; of the socket "L'" mounted on or carried by the top member "L" of the rectangular frame and adapted to carry the seat or saddle for the rider; of the socket "F" mounted on the tubular extension "e" of the fork "F" and carrying the transverse steering handle bar "G;" of the connecting or coupling rod "O" and the arms or brackets "f" and "h" fixed respectively to the socket "F" and the socket "H;" of the driving cranks "C" fixed on the ends of the axle "B" carrying the driving wheel and provided with pedals of the ordinary construction; and of the bearings "D" in which the axle of the driving wheel is mounted and which are supported or attached to the rectangular frame at the junction of the forks "E" and "E'" substantially as and for the purpose set forth.

GEORGE RICHARD FENNER.

Witnesses:
JOHN ARTHUR LIDDELL,
ALFRED CHARLES VICTOR FENNER.